(12) United States Patent
Hossain et al.

(10) Patent No.: US 7,443,786 B2
(45) Date of Patent: Oct. 28, 2008

(54) APPARATUS AND METHODS FOR HOME AGENT RESILIENCY FOR MOBILE IPV4

(75) Inventors: Mahmood Hossain, Cary, NC (US); Suresh Bhogavilli, Gaithersburg, MD (US); Chirayu Shah, Germantown, MD (US); Kevin Purser, Bethesda, MD (US)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 365 days.

(21) Appl. No.: 11/269,015

(22) Filed: Nov. 8, 2005

(65) Prior Publication Data

US 2007/0104146 A1    May 10, 2007

(51) Int. Cl.
*G01R 31/08* (2006.01)

(52) U.S. Cl. .................. 370/216; 370/217; 370/218

(58) Field of Classification Search .......... 370/216–228
See application file for complete search history.

(56) References Cited

U.S. PATENT DOCUMENTS 7,227,863 B1 * 6/2007 Leung et al. ............... 370/390

2002/0080752 A1 * 6/2002 Johansson et al. ........... 370/338
2004/0202126 A1   10/2004 Leung

FOREIGN PATENT DOCUMENTS

EP    1523140 A    4/2005

* cited by examiner

*Primary Examiner*—Lester Kincaid
*Assistant Examiner*—Steven Lim
(74) *Attorney, Agent, or Firm*—Roger S. Burleigh

(57) ABSTRACT

Providing resiliency for mobile terminal data sessions, wherein the data sessions rely on Internet Protocol Version 4 and wherein at least one Home Agent node maintains a mobility bindings database for all registered mobile terminals while they are away from a home network. A first aspect of the invention provides physical Home Agent redundancy, perceived by each mobile node as Home Agent IP address redundancy, and a second aspect provides session resiliency. While the second aspect of the invention provides for session resiliency, it uses a mechanism of the former for master failure detection and Home Agent IP address take-over by a backup Home Agent.

20 Claims, 3 Drawing Sheets

APPARATUS AND METHODS FOR HOME AGENT RESILIENCY FOR MOBILE IPV4

TECHNICAL FIELD OF THE INVENTION

The present invention is directed, in general, to communications networks, and, more specifically, to apparatus and methods for Home Agent resiliency for mobile Internet Protocol (IP) Version 4 (IPv4).

BACKGROUND OF THE INVENTION

Seamless mobility for data sessions across multiple radio access networks, such as UTRAN, CDMA2000 and WLAN, is possible with IP-level macro mobility. For IPv4 networks, IP mobility is described in Internet Engineering Task Force (IETF) Request for Comment (RFC) 3344, which introduces three logical entities on IPv4 networks: Mobile IP client functionality on hosts; Foreign Agent (FA) functionality on designated routers on roaming/foreign networks; and, Home Agent (HA) functionality on a user's home IP network. The protocol defines a mechanism by which mobile IP compliant mobile terminals, or nodes, can maintain their network level association (i.e., IP address) while moving from network to network, essentially maintaining seamless transport sessions across network boundaries. The centerpiece of the protocol is the services provided by a designated router at the home network called a Home Agent. The Home Agent provides the services of seamless mobility to registered mobile nodes while away from the home network. The Home Agent acts, essentially, as a default router for the mobile nodes while they are away from the home network. It intercepts all routed packets destined for roaming mobile nodes and tunnels them to the mobile nodes' current care-of-address, which resides in the FA.

There exists a problem, however, with the Mobile IPv4 Home Agent as specified in IETF RFC3344. The Home Agent as specified in IETF RFC3344 is a stateful router; i.e., it maintains a mobility bindings database for all registered mobile nodes while they are away from the home network. The mobility binding for a particular mobile node is a data structure containing, minimally, the mobile node's home IP address, current care-of-address (i.e., FA IP address), mobility lifetime and other mobile node specific information. The Home Agent, however, can be a single-point-of-failure from the point of view of Mobile IP operation; i.e., if the Home Agent fails, all on-going mobile IP sessions supported by the failed Home Agent will be lost; there is no redundancy or resiliency solution in the Mobile IP protocol.

Accordingly, there is a need in the art for improved apparatus and methods for Home Agent resiliency for Mobile Internet Protocol (IP) Version 4 (MIPv4). Preferably, such apparatus and methods will utilize the existing hardware infrastructure associated with conventional communications networks, thereby reducing the cost of implementing such improved systems and methods.

SUMMARY OF THE INVENTION

To address the above-discussed deficiencies of the prior art, the present invention, disclosed are systems and methods for providing resiliency for mobile terminal data sessions, wherein data sessions rely on Internet Protocol Version 4 and wherein a Home Agent node maintains a mobility bindings database for all registered mobile terminals while they are away from a home network. The method includes the steps of establishing, using Virtual Router Redundancy Protocol (VRRP) according to IETF RFC3768, a VRRP group comprising a master Home Agent (m-HA) and at least one backup Home Agent (b-HA), wherein the master Home Agent (m-HA) automatically assumes the role of a Virtual Home Agent (v-HA) Function (VHAF), and wherein VRRP packets transmitted between the master Home Agent and backup Home Agents include an advertisement interval field having a sub-second value. Session resiliency of the mobile terminal data sessions is maintained in the event of a failure of the master Home Agent by sending, from a mobile terminal to the master Home Agent (m-HA), a mobile IP Registration Request (RRQ). If the Registration Request is validated and authenticated by the master Home Agent, a Registration Reply (RRP) message is sent to the mobile terminal and a Proxy Registration Request (PRRQ) message is sent to the backup Home Agents. The backup Home Agent sends a Proxy Registration Reply (PRRP) message acknowledging the proxy registration to the master Home Agent. The backup Home Agent detects, via the VRRP packets, the failure of the master Home Agent, and one of the backup Home Agents then assumes the role of master Home Agent. For reasons of simplicity, it is assumed that messages exchanged between nodes reach the nodes reliably; thus, details on protocol implementation and reliability aspects are not explained. Those skilled in the art will recognize, for instance, that robustness can be built into the protocol by retransmitting critical messages.

Upon the recovery of a previously failed master Home Agent, a Synchronization Status flag is set by the previously failed master Home Agent to false, indicating that its mobility bindings database needs to be rebuilt from the current master Home Agent or another of the backup Home Agents, and it sets itself as a backup Home Agent. A Mobility Binding Database Discovery Request (MDBDRQ) message is then sent from the previously failed master Home Agent to all Home Agents. The current master Home Agent and any backup Home Agents having a Synchronization Status flag set to true then send a Mobility Binding Database Discovery Reply (MDBDRP) message to the previously failed master Home Agent, each MDBDRP message indicating a priority of the responding Home Agents among the VRRP group. The previously failed master Home Agent then selects a synchronization Home Agent from one of the Home Agents that sent a MDBDRP message from which to synchronize its mobility binding database as a function of the priorities of the responding Home Agents among the VRRP group. The previously failed master Home Agent then sends a Mobility Binding Database Build Request (MDBBRQ) message to the selected synchronization Home Agent, and the synchronization Home Agent sends one or more Mobility binding Database Build Response (MDBBRS) messages, containing one or more mobility database entries, to the previously failed master Home Agent. In response to each MDBBRS message, the previously failed master Home Agent sends a Mobility Binding Database Build Acknowledgement (MDBBAck) message to the synchronization Home Agent.

The foregoing has outlined, rather broadly, the principles of the present invention so that those skilled in the art may better understand the detailed description of the exemplary embodiments that follow. Those skilled in the art should appreciate that they can readily use the disclosed conception and exemplary embodiments as a basis for designing or modifying other structures and methods for carrying out the same purposes of the present invention. Those skilled in the art should also realize that such equivalent constructions do not depart from the spirit and scope of the invention in its broadest form, as defined by the claims provided hereinafter.

BRIEF DESCRIPTION OF THE DRAWINGS

For a more complete understanding of the present invention, reference is now made to the following detailed description taken in conjunction with the accompanying drawings, in which.

DETAILED DESCRIPTION OF THE DRAWINGS

Figure 1:
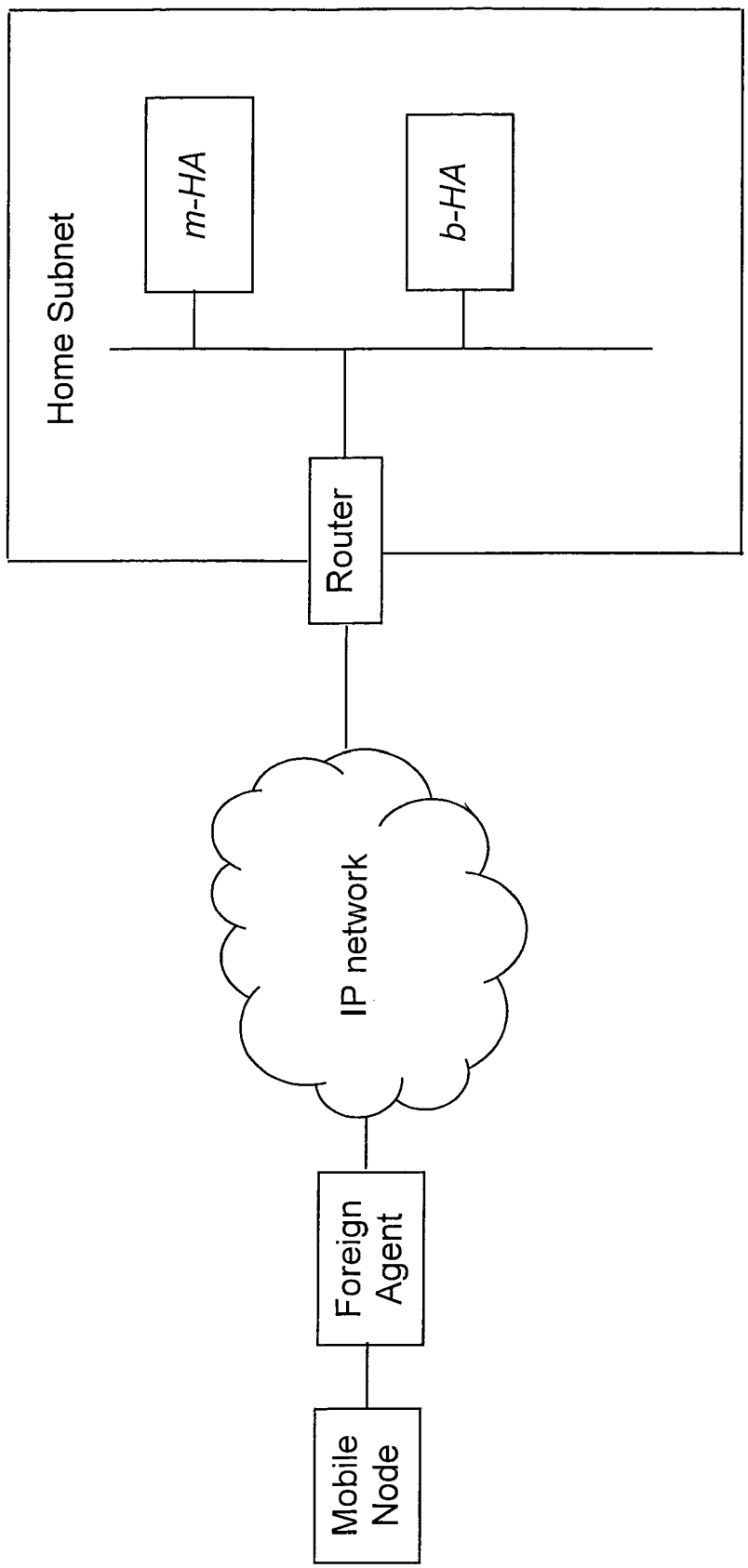
FIG. 1 illustrates the general topology of a network in which the disclosed invention can be used to advantage.

To overcome the problems identified, apparatus and methods will now be described for Home Agent resiliency for Mobile Internet Protocol (IP) Version 4 (MIPv4). A first aspect of the invention provides physical Home Agent redundancy, perceived by each mobile node as Home Agent IP address redundancy, and a second aspect provides session resiliency. While the second aspect of the invention provides for session resiliency, it uses a mechanism of the former for master failure detection and Home Agent IP address takeover by a backup Home Agent. The functions and signaling to be described can be understood with reference to FIG. 1, which illustrates the general topology of a network in which the disclosed invention can be used to advantage, and FIGS. 2 and 3, which illustrate particular network embodiments of the invention.

According to the first aspect of the invention, Home Agent failure detection and recovery is facilitated by redundancy of the Home Agent, identified by a virtual "Home Agent IP Address." From the perspective of a mobile node, the Home Agent IP Address should be always reachable/available, irrespective of a particular Home Agent node failure. This requires a backup Home Agent node to take-over the virtual Home Agent IP Address when the primary Home Agent node fails. To accomplish this, the Virtual Router Redundancy Protocol (VRRP) described in Internet Engineering Task Force (IETF) Request for Comment (RFC) 3768 (incorporated herein by reference) can be used between master and backup Home Agent nodes. The master and backup Home Agent nodes can use VRRP to provide uninterrupted "Virtual Home Agent Function" services towards home-away mobile nodes.

A "Virtual Home Agent Function" is defined with three parameters: 1) a virtual IP address; 2) a virtual MAC address; and, 3) a virtual Home Agent ID. A master Home Agent node can own the "Virtual Home Agent Function" and use a <virtual IP address, virtual MAC address> pair while serving the mobile nodes. In case of a master Home Agent failure, the <virtual IP address, virtual MAC address> pair is taken-over by a backup Home Agent. The standard VRRP, as defined in RFC3768, uses seconds as the granularity of time for master failure detection, which is carried in the advertisement interval ("Adver Int") field of each VRRP packet, expressed in number of seconds. In adapting VRRP for Home Agent failure detection and recovery for the present invention, the advertisement interval ("Adver Int") field's value is preferably in the sub-second range (e.g., milliseconds); herein, this specific adaptation of VRRP is referred to as "sub-second VRRP."

According to the second aspect of the invention, session Resiliency (i.e., Fail-over Protection of Mobility Bindings), ensures that not only is the availability and reachability of a home agent maintained following a master home agent failure, but all on-going mobile IP sessions are maintained as well. This capability provides for full redundancy of home agent services, and the solution is transparent to the mobile nodes.

A Virtual Home Agent Function (VHAF, or v-HA) is defined using a 3 parameters tuple: <a virtual Home Agent Identifier (VHAID), virtual Home Agent IP address (VHAIPA), and a virtual MAC address (VHAMAC)>; this is similar to how a Virtual Router is defined according to VRRP (IETF RFC3768). As illustrated in FIG. 1, two (or more) Home Agent nodes are configured on a home subnet to form a VRRP group, with priorities between 0-255. The HA node with the highest priority is the potential owner of the v-HA function. The <VHAID, VHAIPA, VHAMAC> tuple is not owned by any particular HA node to start with; the HAs go through a master election process. The HA node with the highest priority claims the master role and the HAs delegate themselves to backup HAs (b-HA). The master HA (m-HA) automatically assumes the role of v-HA, including ownership of <VHAID, VHAIPA, VHAMAC>. The m-HA and all b-HAs are configured with the same set of mobile IP parameters required for the v-HA function; i.e., mobility security associations with supported mobile nodes, and mobility security associations with foreign agents, if such optional security associations are available. This provides the necessary set-up for VRRP to be executed between m-HA and one or more b-HA to provide redundancy for the v-HA function.

Figure 2:
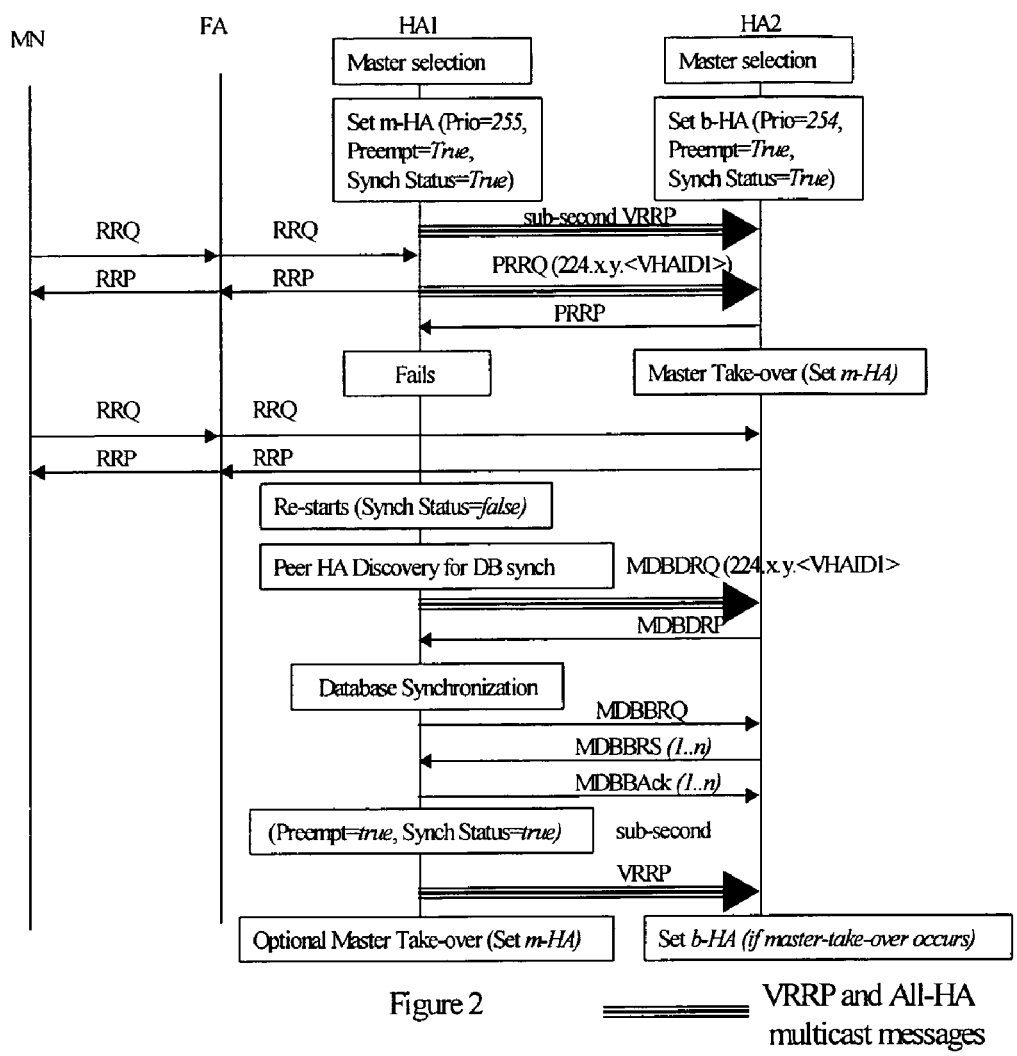
FIG. 2 illustrates a first exemplary signaling diagram for a Home Agent resiliency solution according to the principles of the invention; and, FIG. 3 illustrates a second exemplary signaling diagram for a Home Agent resiliency solution according to the principles of the invention, adapted for support of multiple failures.

For resiliency of mobile IP sessions serviced by v-HA, two messages are defined between m-HA and b-HAs: Proxy Registration Request (PRRQ) and Proxy Registration Reply (PRRP). As illustrated in FIG. 2, a mobile node, MN, sends a mobile IP Registration Request (RRQ) message to a m-HA (e.g., HA1) via a Foreign Agent (FA) or directly to m-HA using collocated Care-of-address (COA) according to IETF RFC3344. After proper validation and authentication, if the m-HA accepts the RRQ message, it sends a PRRQ message to the b-HAs (e.g., HA2) after sending the Registration Reply (RRP) message to the MN indicating a successful registration. The b-HA(s) send acknowledgement of the proxy registration by sending a PRRP message to the m-HA. Depending on the redundancy configuration (i.e., a single or multiple b-HAs), the PRRQ message can be sent as a unicast message or addressed to an all-HA multicast address dedicated for the VHAF. For example, an all-HA multicast address can be formulated as 224.x.y.<VHAID>, where the last octet of the multicast address is the virtual HA ID. Each participating HA node can join the corresponding all-HA multicast group identified by the last octet of the multicast address, which is equal to the VHAID of the VHAF. The PRRP message is a unicast message addressed to the m-HA. The PRRP and PRRQ messages ensure that the mobility session databases in all b-HAs are synchronized in real-time with that of the m-HA. In one embodiment, the PRRQ message is transported on UDP with 434 as destination port (same as under IETF RFC3344), and contains mobility binding information related to the MN being registered; i.e., a mobile node's home IP address, care-of-address, remaining lifetime, identification number, and mobility specific options; this information is identical to that in an RRP message when the registration succeeds.

If the m-HA node fails, the b-HAs will detect this failure via the "sub-second VRRP," and they can quickly select a new master. The new m-HA is already synchronized with respect to mobility binding databases of the failed m-HA, up until the point of failure. The new m-HA now assumes the new v-HA role, taking ownership of the <VHAIPA, VHAMAC> tuple and acting as the new m-HA. When the previously failed m-HA is recovered, it sets a special flag, Synchronization Status, to "false," denoting the fact that its mobility bindings database was lost during the failure and it has yet to rebuild its database from the current m-HA or any other surviving b-HAs; every other HA node (m-HA and b-HA) that is already synchronized has its Synchronization Status flag set to "true." The previously failed m-HA also sets itself as a b-HA. To re-build its lost mobility bindings database, the newly started b-HA (i.e., previously failed m-HA) should look for a surviving Home Agent from which to synchronize its mobility bindings database. Preferably, a b-HA, rather than the current m-HA, is used for synchronization to relieve the current m-HA from the over-head of re-synchronization and to allow it to easily handle v-HA functions towards the mobile nodes.

For database synchronization, two HA discovery messages are defined: Mobility Binding Database Discovery Request (MDBDRQ) and Mobility Binding Database Discovery Reply (MDBDRP). The newly started b-HA (i.e., previously failed m-HA) sends a MDBDRQ message as a multicast packet addressed to all-HA multicast address. All surviving HA nodes (with synchronized flag=true), including the current m-HA, respond to the discovery request message by sending a unicast MDBDRP reply to the requesting b-HA, indicating the nodes priority. The requesting HA (i.e., previously failed m-HA) then selects a HA node, preferably with the lowest priority, to download the database. If no alternate b-HA exists, the current master m-HA is selected for synchronization.

For mobility bindings database synchronization, three messages are used between the re-started b-HA (i.e., previously failed m-HA) and the selected HA to enable the restarted b-HA to synchronized its database: Mobility Binding Database Build Request (MDBBRQ), Mobility Binding Database Build Response (MDBBRS), and Mobility Binding Database Build Acknowledgement (MDBBAck). The re-started b-HA initiates a MDBBRQ request to the selected HA node. In response to this request, the selected HA node will send a series of MDBBRS messages containing as many mobility bindings database entries as can be accommodated within a single message, which is constrained by the MTU of the logical/physical link, until there are no more entries in its database. In return, the re-started b-HA acknowledges each MDBBRS message with a corresponding MDBBAck message, thereby acknowledging the receipt of the given number of database entries. The first MDBBRS message preferably contains an indicator flag stating that it is the first of a series of such messages. The last MDBBRS message preferably contains another indicator flag indicating the end of database transfer. Once the whole mobility bindings database is transferred, the re-started b-HA resets its Preempt Mode and Synchronization Status to "true." When preempt mode is set to true, the restarted b-HA can use the standard VRRP preemption method (defined in IETF RFC3768) to resume mastership of the VHAF. At the end of preemption, the VHAF configuration is exactly the same as it was before the failure.

During the database synchronization, the newly started b-HA may receive PRRQ messages from the m-HA regarding new registrations/updates from live mobile nodes. It should respond to these live updates by appropriately accepting and marking those entries as the latest and send PRRP acknowledgement messages back to the m-HA.

Figure 3:
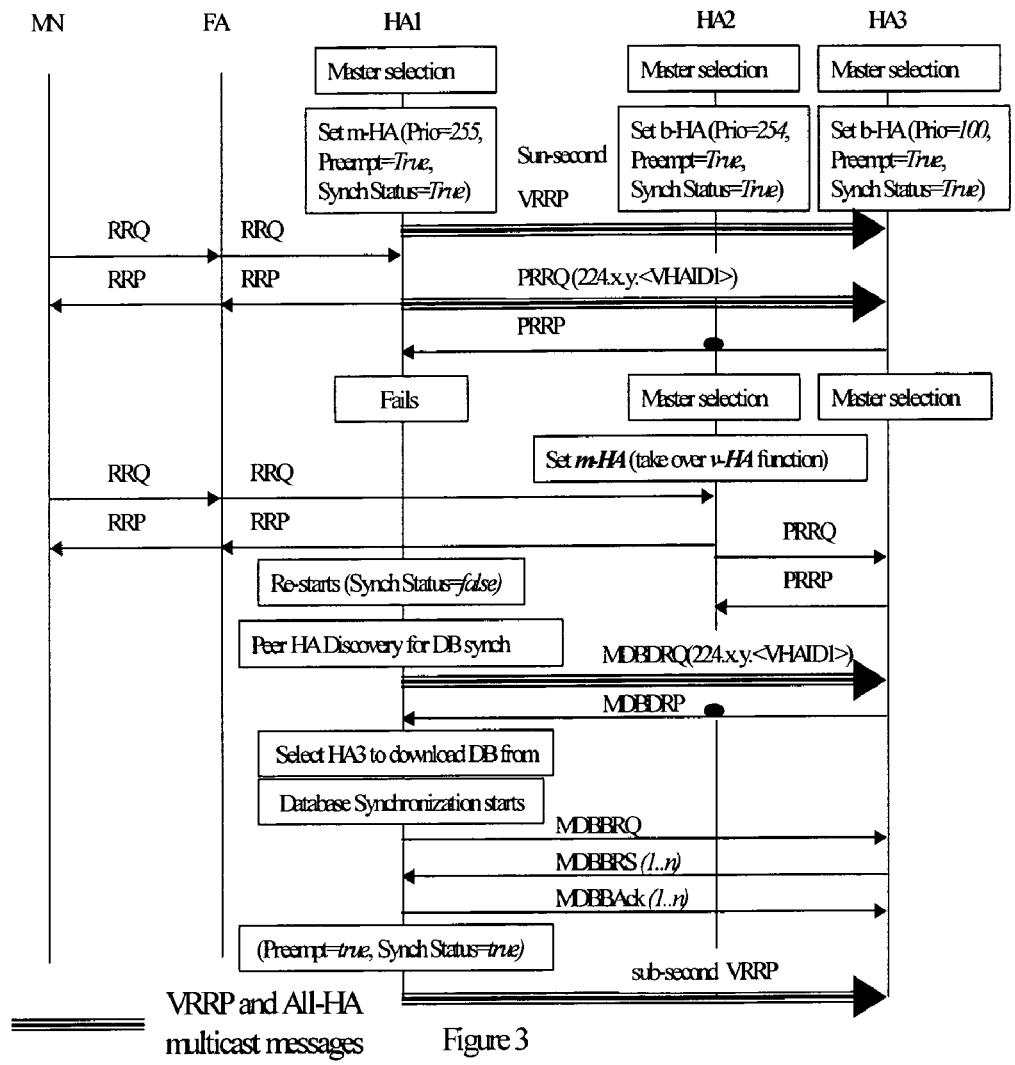

FIGS. 2 and 3 illustrate the above-described signal operations for two network use cases. FIG. 2 illustrates a resiliency solution, according to the principles of the invention, for one Virtual Home Agent Function with support for single failures, defined by Home Agent Function (VHAF) v-HA1 <VHAID1, VHAIPA1, VHAMAC1>. FIG. 2 illustrates the signalling for a typical use case for a Resilient IPv4 Mobile IP Home Agent function for a v-HA provided by two physical HA nodes. Using two HA nodes, single failure cases can be handled. (Those skilled in the art should note that the proxy ARP and gratuitous ARP messages generated by the m-HA after successful MIP registration message processing (as required by IETF RFC3344) are not shown in the diagram.) FIG. 3 illustrates a resiliency solution, according to the principles of the invention, for one Virtual Home Agent Function with support for multiple failures, defined by VHAF v-HA <VHAID1, VHAIPA1, VHAMAC1>. FIG. 3 illustrates the signalling for a typical use case for a Resilient IPv4 Mobile IP Home Agent function identified by v-HA, provided by a cluster of three physical HA nodes; at least three HA nodes are required for handling multiple failures. (Those skilled in the art should note that the proxy ARP and gratuitous ARP messages generated by the m-HA after successful MIP registration message processing (as required by IETF RFC3344) are not shown in FIGS. 2 and 3.)

From the foregoing, those skilled in the art will recognize that the principles of the invention can be extended to provide a resiliency solution for two Virtual Home Agent Functions. In such embodiments, two Virtual Home Agent Functions, v-HA1 <VHAID1, VHAIPA1, VHAMAC1>and v-HA2 <VHAID2, VHAIPA2, VHAMAC2>, are defined. The use cases illustrated in FIGS. 1 and 2 can easily be extended to handle resiliency of two virtual Home Agents (v-HA1 and v-HA2) using the same number of physical home agent nodes. In such embodiments, a particular HA node can act as an m-HA for v-HA1 and as a b-HA for v-HA2 at the same time. It is also possible for a particular HA node to act as b-HAs both for v-HA1 and v-HA2 at the same time. This is especially useful in deployments where load balancing is also achieved between two Virtual Home Agent Functions along with resiliency. Those skilled in the art will also recognize that the use of all-HA multicast address per VHAF will reduce the unnecessary multicast traffic.

Although the present invention has been described in detail, those skilled in the art will conceive of various changes, substitutions and alterations to the exemplary embodiments described herein without departing from the spirit and scope of the invention in its broadest form. The exemplary embodiments presented herein illustrate the principles of the invention and are not intended to be exhaustive or to limit the invention to the form disclosed; it is intended that the scope of the invention be defined by the claims appended hereto, and their equivalents.

What is claimed is:

1. A method for providing resiliency for mobile terminal data sessions, wherein said data sessions rely on Internet Protocol Version 4 and wherein at least one Home Agent node maintains a mobility bindings database for all registered mobile terminals while they are away from a home network, said method comprising the steps of:

establishing, using Virtual Router Redundancy Protocol (VRRP) according to IETF RFC3768, a VRRP group comprising a master Home Agent (m-HA) and at least one backup Home Agent (b-HA), wherein said master Home Agent (m-HA) automatically assumes the role of a Virtual Home Agent (v-HA) Function (VHAF), and wherein VRRP packets transmitted between said master Home Agent and said at least one backup Home Agent include an advertisement interval field having a sub-second value;

maintaining session resiliency of said mobile terminal data sessions in the event of a failure of said master Home Agent by:
sending, from a mobile terminal to said master Home Agent (m-HA), a mobile IP Registration Request (RRQ);
if said Registration Request is validated and authenticated said by said master Home Agent, sending a Registration Reply (RRP) message to said mobile terminal and sending a Proxy Registration Request (PRRQ) message to said at least one backup Home Agent (b-HA) using a dedicated multicast address for all Home Agents (all-HA);
sending, from said at least one backup Home Agent to said master Home Agent, a Proxy Registration Reply (PRRP) message acknowledging said proxy registration;
detecting by said at least one backup Home Agent, via said VRRP packets, the failure of said master Home Agent;
assuming, by one of said at least one backup Home Agent, the role of master Home Agent.

2. The method recited in claim 1, wherein said Registration Request (RRQ) is sent by said mobile terminal to said master Home Agent (m-HA) via a Foreign Agent (FA).

3. The method recited in claim 1, wherein said Registration Request (RRQ) is sent by said mobile terminal directly to said master Home Agent (m-HA) using collocated Care-of-Address (COA) in accordance with IETF RFC3344.

4. The method recited in claim 1, wherein said at least one backup Home Agent comprises a plurality of backup Home Agents, and wherein said step of sending, from said at least one backup Home Agent to said master Home Agent, a Proxy Registration Reply (PRRP) message acknowledging said proxy registration comprises sending said PRRP message using a unicast address of said master Home Agent.

5. The method recited in claim 4, wherein said dedicated multicast address comprises a virtual Home Agent ID.

6. The method recited in claim 1, wherein, upon the recovery of said previously failed master Home Agent, said method further comprises the steps of:
setting a Synchronization Status flag by said previously failed master Home Agent to false, indicating that its mobility bindings database needs to be rebuilt from the current master Home Agent or another of said at least one backup Home Agents, and setting itself as a backup Home Agent;
sending, from said previously failed master Home Agent to all Home Agents, a Mobility Binding Database Discovery Request (MDBDRQ) message;
sending, from said current master Home Agent and of said at least one backup Home Agents having a Synchronization Status flag set to true, a Mobility Binding Database Discovery Reply (MDBDRP) message to said previously failed master Home Agent, each said MDBDRP message indicating a priority of the responding Home Agents among said VRRP group;
selecting, by said previously failed master Home Agent, a synchronization Home Agent from one of said Home Agents that sent a MDBDRP message from which to synchronize its mobility binding database as a function of said priorities of the responding Home Agents among said VRRP group;
sending a Mobility Binding Database Build Request (MDBBRQ) message from said previously failed master Home Agent to the selected synchronization Home Agent;
sending, from said synchronization Home Agent to said previously failed master Home Agent, one or more Mobility binding Database Build Response (MDBBRS) messages containing one or more mobility database entries; and,
in response to each MDBBRS message, sending, from said previously failed master Home Agent to said synchronization Home Agent, a Mobility Binding Database Build Acknowledgement (MDBBAck) message.

7. The method recited in claim 6, wherein said previously failed master Home Agent selects the Home Agent that sent a MDBDRP message having the lowest priority from which to synchronize its mobility binding database.

8. The method recited in claim 6, wherein the first of said one or more Mobility binding Database Build Response (MDBBRS) messages includes an indicator flag identifying the message as the first of a series of MDBBRS messages.

9. The method recited in claim 8, wherein the last of said one or more Mobility binding Database Build Response (MDBBRS) messages includes an indicator flag identifying the message as the last of said series of MDBBRS messages.

10. The method recited in claim 6, wherein, after receiving all of said one or more Mobility binding Database Build Response (MDBBRS) messages, said previously failed master Home Agent resets its Synchronization Status flag to True.

11. A master Home Agent node for providing resiliency for mobile terminal data sessions, wherein said data sessions rely on Internet Protocol Version 4 and wherein said master Home Agent node and at least one backup Home Agent node maintain a mobility bindings database for all registered mobile terminals, said master Home Agent comprising:
means for establishing, using Virtual Router Redundancy Protocol (VRRP) according to IETF RFC3768, a VRRP group comprising-said master Home Agent (m-HA) and at least one backup Home Agent (b-HA), wherein said master Home Agent automatically assumes the role of a Virtual Home Agent (v-HA) Function (VHAF), and wherein VRRP packets transmitted between said master Home Agent and said at least one backup Home Agent include an advertisement interval field having a sub-second-value;
means for maintaining session resiliency of said mobile terminal data sessions in the event of a failure of said master Home Agent, said means for maintaining resiliency comprising:
means for receiving, from a mobile terminal, a mobile IP Registration Request (RRQ);
means for validating and authenticating said Registration Request;
means for sending a Registration Reply (RRP) message to said mobile terminal and sending a Proxy Registration Request (PRRQ) message to said at least one backup Home Agent (b-HA);
means for receiving, from said at least one backup Home Agent, a Proxy Registration Reply (PRRP) message acknowledging said proxy registration;
means for periodically sending said VRRP packets to said at least one backup Home Agent, whereby said at least one backup Home Agent can detect the failure of said master Home Agent upon the cessation of receipt of said VRRP packets.

12. The master Home Agent recited in claim 11, wherein said Registration Request (RRQ) is received by said master Home Agent (m-HA) from a Foreign Agent (FA).

13. The master Home Agent recited in claim 11, wherein said Registration Request (RRQ) is sent by said mobile terminal directly to said master Home Agent (m-HA) using collocated Care-of-Address (COA) in accordance with IETF RFC3344.

14. The master Home Agent recited in claim 11, wherein said at least one backup Home Agent comprises a plurality of backup Home Agents, and wherein said Proxy Registration Reply (PRRP) message acknowledging said proxy registration comprises a dedicated multicast address for all Home Agents (all-HA).

15. The master Home Agent recited in claim 14, wherein said dedicated multicast address comprises a virtual Home Agent ID.

16. The master Home Agent recited in claim 11, further comprising:
- means for setting a Synchronization Status flag by said previously failed master Home Agent to false upon recovery from a failed state, said flag indicating that the mobility bindings database of said previously failed master Home Agent needs to be rebuilt from a current master Home Agent or another of said at least one backup Home Agents;
- means for setting said previously failed master Home Agent as a backup Home Agent;
- means for sending to all Home Agents a Mobility Binding Database Discovery Request (MDBDRQ) message;
- means for receiving, from the current master Home Agent and any of said at least one backup Home Agents having a Synchronization Status flag set to true, a Mobility Binding Database Discovery Reply (MDBDRP) message, each said MDBDRP message indicating a priority of the responding Home Agents among said VRRP group;
- means for selecting a synchronization Home Agent from one of said Home Agents that sent a MDBDRP message from which to synchronize its mobility binding database as a function of said priorities of the responding Home Agents;
- means for sending a Mobility Binding Database Build Request (MDBBRQ) message to the selected synchronization Home Agent;
- means for receiving, from said synchronization Home Agent, one or more Mobility binding Database Build Response (MDBBRS) messages containing one or more mobility database entries; and,
- means for sending, in response to each MDBBRS message, a Mobility Binding Database Build Acknowledgement (MDBBAck) message.

17. The master Home Agent recited in claim 16, wherein said previously failed master Home Agent selects the Home Agent that sent a MDBDRP message having the lowest priority from which to synchronize its mobility binding database.

18. The master Home Agent recited in claim 16, wherein the first of said one or more Mobility binding Database Build Response (MDBBRS) messages includes an indicator flag identifying the message as the first of a series of MDBBRS messages.

19. The master Home Agent recited in claim 18, wherein the last of said one or more Mobility binding Database Build Response (MDBBRS) messages includes an indicator flag identifying the message as the last of said series of MDBBRS messages.

20. The master Home Agent recited in claim 16, wherein, after receiving all of said one or more Mobility binding Database Build Response (MDBBRS) messages, said previously failed master Home Agent resets its Synchronization Status flag to True.

* * * * *